Patented July 14, 1953

2,645,627

UNITED STATES PATENT OFFICE 2,645,627

ACID ADSORBING RESIN ADSORPTION PRODUCT

Edwin L. Gustus, Chicago, Ill.

No Drawing. Application April 23, 1948,
Serial No. 22,961

5 Claims. (Cl. 260—45)

This invention relates to medicinal substances, and more specifically to treatment agents for peptic ulcer.

Heretofore, this pathological condition has been medically treated mainly with antacids, which have the function of reducing the free acidity of the stomach contents, and also with emollients or gel-forming substances, which had for their object protection of the ulcerated tissues from mechanical or abrasive action of ingested foods.

More recently surface active protein denaturants, particularly the sodium salts of the mono-esters of sulfuric acid with lauryl alcohol and with other higher aliphatic alcohols have been used. These substances are commonly referred to as sodium alkyl sulfates. The theory behind this treatment is that these substances have a direct specific inactivating effect on pepsin, a proteinaceous enzyme known to have a corrosive action on ulcerated tissues in cases of peptic ulcer. Furthermore, acid adsorbing organic resins in their basic form have been employed with the expectation that these would reduce the amount of free acid of the gastro-duodenal liquids by combining with the free acids. While each of these treatment methods has had a measure of success, none has proved entirely and completely successful in all cases of peptic ulcer.

An object of the present invention is an improved medical treatment for peptic ulcer and a composition for such treatment. Another object is a new medicinal composition. Further objects will become apparent as the following detailed description proceeds:

I have discovered that an acid adsorbing resin in its base form when combined with a mono alkyl ester of sulfuric acid is extremely effective as a treatment agent for peptic ulcer. Sodium lauryl sulfate employed in prior art is very soluble in stomach liquids and rapidly passes from the stomach further along the gastro-intestinal tract. Although the concentration of sodium lauryl sulfate needed to inactivate pepsin is small, the maintenance of this needed concentration in the stomach and upper portion of the duodenum requires frequent and relatively large doses of the soluble sodium alkyl sulfate since its great solubility in stomach liquids makes for rapid passage away from the stomach and upper portion of the duodenum which are most frequently the sites of peptic ulcers. This necessary elevated and frequent dosage has given rise to undesired symptoms in certain patients, definitely restricting the usefulness of the method.

Further, sodium lauryl sulfate employed in prior art is not significantly adsorbed by acid adsorbing resins in base form. Even if used together with such acid adsorbing resins in base form, sodium alkyl sulfates are not bound to these resins in appreciable degree and being very soluble, rapidly pass from the stomach and upper portion of the duodenum, since it is well known that liquids tend to pass much more rapidly than solids from the stomach to lower portions of the digestive tract. The use, therefore, of a mixture of sodium alkyl sulfate together with an acid adsorbing resin could not be expected to increase the time which the former would be retained in the stomach under circumstances in which both substances were administered with the object of reducing the free acid in the stomach contents by means of the resin and directly inhibiting the activity of pepsin by means of the sodium alkyl sulfate.

In contra-distinction, if a mono alkyl ester of sulfuric acid is intermixed as an aqueous solution with a solid acid adsorbing resin in base form, the ester being an acid combines with the acid adsorbing resin yielding a unified solid complex in which the acid combining power of the acid adsorbing resin has been largely or completely neutralized by the mono alkyl ester of sulfuric acid. This solid complex possesses new therapeutic properties and shows distinct differences from, for example, a mixture of acid adsorbing resin and sodium alkyl sulfate; for example, the composition of this invention, which is the solid complex of acid adsorbing resin and mono alkyl sulfate referred to above, does not appreciably reduce the free acidity of stomach liquids. Further, the alkyl sulfuric acid is slowly released by the complex in the presence of stomach juices providing a continuous low but adequate concentration of the mono alkyl sulfuric acid ion for the inhibition of the activity of the pepsin. Since the composition is a solid, it tends to be retained longer in the stomach than a liquid and thus provides the necessary concentration of mono alkyl sulfate ion for a much longer period of time and, therefore, permits adequate treatment of the peptic ulcer to be achieved with less amounts of free mono alkyl sulfate than are required if the soluble sodium salt of the mono alkyl sulfate of prior art be used as the treatment agent, in this way reducing the necessary total dosage of mono alkyl sulfate ion and avoiding the undesirable symptoms frequently observed when adequate dosage of the sodium alkyl sulfate of prior art is used. The slow release of mono alkyl sulfate from the solid complex composition results from an exchange of mono alkyl sulfate of the complex for the free acid, principally hydrochloric acid, of the stomach secretion. The administration of the solid complex, therefore, permits the maintenance of concentrations of mono alkyl sulfate in the stomach liquids sufficient to inhibit the peptic activity and for a prolonged period without the need of relatively large and frequent dosage such as is required if the soluble sodium alkyl sulfate of prior art is used. The total necessary dosage of free mono alkyl sulfate ion is thereby reduced and undesired effects of the larger necessary dosage of the soluble sodium alkyl sulfate of prior art are avoided.

The preparation of the solid complex is illustrated in the following examples:

The crystalline mixture of the sodium salts of mono dodecyl sulfate and mono tetra decyl sulfate in the amount of 800 grams was dissolved in 7000 ml. of distilled water. To this solution was added 4500 grams of dry granulated phenol formaldehyde cation exchange resin in hydrogen or acid form. The mixture was allowed to stand for one hour at room temperature with occasional stirring and then filtered. The clear acid filtrate now contains the free mono dodecyl and mono tetradecyl esters of sulfuric acid, the alkali metal ion of the original salts having been exchanged for hydrogen by the cation exchange resin in hydrogen form. This filtrate was intermixed with 425 grams of a dry polyamine phenol formaldehyde acid adsorbing resin (polyethylene polyamine methylene substituted resin of diphenylol dimethyl methane and formaldehyde) in base form, finely pulverized and previously moistened for one hour with enough distilled water to form a paste. The mixture was allowed to stand with frequent stirring for five hours and was then filtered. The filtrate was then filtered again through the cation exchange resin used above. The filtrate was mixed with the partially saturated acid adsorbing resin and the mixture was allowed to stand with frequent stirring for five hours. The acid adsorbing resin was again filtered off and the filtrate again cycled through the cation exchange resin above. The partially saturated acid adsorbing resin was mixed with this filtrate and allowed to stand for five hours at room temperatures with frequent stirring. The acid adsorbing resin was then filtered off and washed with distilled water and dried. It weighed 1149 grams. The filtrate was found to be acid since an excess of the mixture of sodium dodecyl sulfate and sodium tetradecyl sulfate and of cation exchange resin in hydrogen form had been used. The acid filtrate and the unused capacity of the cation exchange resin in hydrogen form can be utilized in the initial stages of preparing a succeeding batch of acid adsorbing resin saturated with monododecyl and mono tetradecyl esters of sulfuric acid.

This material was then administered in capsules to patients with peptic ulcer, including patients previously treated with sodium lauryl sulfate who had developed undesirable symptoms resembling a cholitis from the treatment. For this purpose I prefer to use capsules or tablets containing from ½ to 10 grains of a composition comprising the product of the above experiment, either pure, or in admixture with excipients, antacids such as magnesia, alumina, and the like, sedatives, etc. In all cases the symptoms of peptic ulcer subsided and improvement was observed in the condition of the ulcers. Patients who formerly had developed undesirable symptoms due to the use of sodium lauryl sulfate were able to obtain the same beneficial effects on the ulcer condition previously obtained and without the development of undesirable symptoms observed in them when sodium lauryl sulfate was used as the treatment agent.

A much more convenient method of preparation employs a novel procedure which has wide application apart from its use shown here:

Acid adsorbing resin in base form and ground to pass through a 150 mesh per inch sieve, in the amount of 10 grams was mixed with an amount of 85 grams of a granulated phenol formaldehyde cation exchange resin in the hydrogen form, which on sifting had been retained on a sieve with 16 meshes per inch. It is desired that the maximum particle size of either of the resins employed should be smaller than the minimum particle size of the other so that the said resin can be substantially separated from each other by methods depending on particle size, such as screening. So long as this difference exists, it is immaterial which resin has the larger size, and what these sizes are. The mixture was thoroughly moistened with distilled water and allowed to soak for half an hour at room temperature. Now 200 cc. of an aqueous solution of a crystalline mixture of sodium dodecyl sulfate and sodium tetradecyl sulfate containing a total amount of 20 grams of the mixture of the above salts was added to the moistened mixture of resins described above. The liquid at once became strongly acid. The container was shaken a few times an hour during the first few hours and was allowed to remain at room temperature overnight to insure the greatest possible saturation of the acid adsorbing resin by the mono alkyl sulfates. Tests now showed the liquid to be strongly acid, indicating presence of an excess of mono alkyl sulfates. The liquid and mixture of resins were filtered off, washed with distilled water until the washings were neutral to litmus and then the mixed resins were dried first at room temperature and then to constant weight at 70° C. The dried resins were then placed on a sieve having 50 meshes per inch and the finer acid adsorbing resin complex with mono alkyl sulfates was readily and completely separated by sifting from coarser sized cation exchange resin which remained on the sieve. The yield of saturated acid adsorbing resin complex with mono alkyl sulfates was 25.58 grams.

As may be seen, the method avoids repeated filtrations and cyclings, reduces the volume of water used, and has especial value when complexes of resin with labile acids may be desired since the free acid, on being formed from its salt by the action of the cation exchange resin in hydrogen form is always in the immediate vicinity of particles of the acid adsorbing resin and is very quickly adsorbed, especially if the salt solution is added slowly and with stirring, remaining in solution as the free acid a very much shorter time than would be the case if the solution of the salt of the acid were first passed through the cation exchange resin and then the solution subsequently passed through an acid adsorbing resin. Even if the cation adsorbing resin and acid adsorbing resin were layered in two layers in a vessel and the aqueous solution of a salt passed through them in the direction from cation exchange resin to acid adsorbing resin, there would be a greater time interval during which the acid would be free in solution than would be the case if the resins were mixed intimately together and the solution of the salt shaken with the mixed resins or added drop by drop to the mixed resins. In the case of salts of acids which are labile or tend to decompose, lactonize or lactamize or otherwise change when in solution as free acids, it would be a better procedure to add the solution of the salt to the mixed resins slowly, preferably dropwise and with stirring since the cation exchange resin forms the acid from the salt with greater rapidity than the acid adsorbing resin can adsorb the free acid. In the present experiment, the free mono alkyl sulfates are sufficiently stable in solution and our objective being to saturate completely the acid adsorbing resin, we were desirous of having an excess of free mono alkyl sulfates present and therefore added the total amount of the solution of the salts at one time. The final separation of the acid adsorbing resin complex from the cation exchange resin could equally well have been carried out by washing the mixture with water on a screen having 50 meshes per inch and washing through the screen the smaller particles of acid adsorbing resin complex, later recovering it in the usual way and drying it.

Another advantage of the above procedure over that of passing a very dilute solution of the acid through a layer of acid adsorbing resin, such as would result from passing a solution of a salt through a layer of cation exchange resin in hydrogen form followed by passage through a layer of acid adsorbing resin in base form, is the greater amount of acid which it is possible to cause to be adsorbed by the acid adsorbing resin when the operation is carried out in the novel manner described. In an experiment, an excess of a dilute solution of mono alkyl sulfates was passed through a layer of 10 grams of acid adsorbing resin until the filtrate came through showing a strongly acid reaction. In this case the acid adsorbing resin complex, after drying in the usual way, amounted to 15.56 grams compared to 25.58 grams obtained with the novel method described using the same amount, 10 grams, of original acid adsorbing resin in base form and having the same particle size.

While in the example, the separation between the particles of the different resins was effected by screening, the invention includes any physical means for effecting this separation.

For example, instead of screening the particles apart, I may separate them by liquid or air flotation, by sedimentation, centrifugation, electrostatic attraction, and any other suitable physical means.

While the methods and preparations disclosed herein are primarily useful for the treatment of peptic ulcers, their utility is much more general. This invention provides a method and means broadly applicable to the inactivation of proteolytic enzymes. Other enzymes which may be thus inactivated are for example rennin, erepsin, trypsin (preferably in alkaline media), papain (preferably in acid media), the polypeptidases, and the like. These enzymes generally are destroyed in a gradual, readily controllable manner, by contact with the adsorbed complexes of this invention.

Such inactivation may be desirable in many industrial processes where the action of proteolytic enzymes is undesirable, but has heretofore been difficult to avoid because of the contamination with proteases of other enzyme preparations. Examples of industrial operation where this may be useful are, for example, the preparation of paper sizes, where amylolytic activity is desired without degradation of protein glue present; preparation of syrups, where less highly purified protein containing starch can be used as the raw material if the conversion is carried out with an enzyme free from protease activity, so that no off flavor is imparted to the product by protein split products; baking with low gluten rye flour, and others.

While reference has been made to certain specific resins, it is understood that other acid adsorbing resins can also be used, provided they are physiologically innocuous and have sufficient capacity for combination with alkyl sulfuric acids. These alkyl sulfuric acids do not have to be prepared by exchange of an alkali metal ion for hydrogen by means of a cation exchange resin in its hydrogen form acting on the alkali metal salt of the alkyl sulfuric acid although this is a preferred and convenient method. The alkyl sulfuric acid could also be prepared for example by treatment under proper conditions of the alkyl alcohol with chlor-sulfonic acid, followed by removal of the hydrogen chloride formed and the excess chlorsulfonic acid under reduced pressure, and also by other well known methods.

In addition to the particular type of polyamine aldehyde resin used in the examples cited here, other acid adsorbing resins could have been used provided, of course, that they have sufficient adsorbing capacity for mono alkyl esters of sulfuric acid and are physiologicaly innocuous. For example, a metaphenylene diamine-formaldehyde acid adsorbing resin could have been used although its adsorbing capacity would have been somewhat lower than that of the resin given in the examples. Still other acid adsorbing resins may be employed such as acid adsorbing resins prepared from amines and polysaccharides, ethanolamine alkyd resins, alkylated aromatic diamines, aromatic diamines both unmodified and modified by incorporating into the resin molecular structure during preparation alkyl groups to form quaternary ammonium bases. Also amine resins co-condensed with aliphatic polyamines or with polyimines may be used or amine resins treated during preparation with cyanamide or with dicyandiamide, thus introducing the strongly basic guanidino group. Acid adsorbing resins prepared by reacting aliphatic polyamines with polyhalogen derivatives of hydrocarbons may be used as well as acid adsorbing modified phenolic resins. In all cases, the resin should be physiologically innocuous or inert, sparingly soluble or insoluble in water and dilute acids or bases and should have an appreciable power to adsorb free mono alkyl esters of sulfuric acid from aqueous solution. While reference has been made by way of example to the dodecyl and tetradecyl mono esters of sulfuric acid, it is understood that a much broader range of mono esters of sulfuric acid can be employed. For example, the mono esters of sulfuric acid with alkyl alcohols having a chain length from 6 up to 30 carbon atoms and either saturated or containing double bonds, may be employed.

It may be often therapeutically desirable to obtain the effect of an initial rapid inactivation of the pepsin in the gastric juice to be followed by a prolonged inactivating effect.

This effect has the advantages that the pepsin already accumulated in the stomach at the time of administration of the drug is inactivated by the initial rapid release of active ingredient, while the subsequent gradual release inactivates pepsin subsequently secreted.

This effect is obtained by the admixture of an alkali, earth alkali or amine salt, or other physiologically innocuous salt of the said mono ester of sulfuric acid, with the adsorbed resin complex disclosed above. While the proportions used may vary, I find from 10% to 50% of the said salts (for example, sodium lauryl sulfate, potassium capryl sulfate, calcium stearyl sulfate, and the like) to be a suitable range, for the purposes of this invention from 20 to 40% of the said salts to 80 to 60% of the resin complex of the alkyl sulfuric acid mono esters, is a preferred proportion.

The compositions of this invention may be used as such, or they may be intermixed with other pharmaceutically compatible ingredients or recipients. For example, it may be desired to give it in capsules, pills, tablets, or as a powder, or even in syrups, elixirs, or emulsions. They may be intermixed with flavoring and coloring materials, clay, bentonite, antacids such as magnesium or aluminum oxide, aluminum phosphates, basic aluminum amino acetate, and analogues and the like, or bismuth suboxide, or bismuth or zirconium subcarbonates, emollients such as methyl cellulose, gastric mucin, carboxy methyl cellulose, sulphated gluten and the like, or with naturally occurring gums and mucilages, gelatin, amino acids and their salts, peptones, peptides, or with any other ingredients cooperative therewith or not incompatible therewith.

The term "acid adsorbing resin," used in the descriptions which have been given, is to be understood as including what are commonly called anion exchange resins. Thus, it is possible to prepare the complex of mono alkyl ester of sulfuric acid and the acid adsorbing resin by employing the resin as an anion exchange resin instead of in free base form. For example, instead of the free base form of the acid adsorbing resin, we could use a resin partially or completely saturated with a weak acid, such as, for example, a weak organic acid, which would be displaced by the stronger mono alkyl ester of sulfuric acid, thus yielding a similar resin complex as would result from the use of the base form of the resin and the mono ester of sulfuric acid. Anion exchange resins which may be used in this manner frequently contain as an active part of the molecular structure the primary aliphatic amino group. As has been pointed out, the acid absorbing resins and ion exchange resins which may be utilized in the present invention are numerous, and include those resins in which the acid adsorption or acid neutralization depends upon, for example, the presence in the resin of aromatic primary amino groups, aliphatic primary amino groups, aromatic secondary amino groups, aliphatic secondary amino groups, aromatic tertiary amino groups, aliphatic tertiary amino groups, and the quaternary ammonium group structures.

It thus is seen that the invention is of broad scope, and is not to be limited excepting by the claims, in which it is my intention to cover all novelty inherent in the invention as broadly as possible in view of prior art.

Having thus disclosed my invention, I claim:

1. A composition of matter comprising a polyamine aldehyde acid adsorbing resin complex with a mono alkyl ester of sulfuric acid having between 6 and 30 carbon atoms.

2. An acid adsorbing resin having adsorbed thereon a mono alkyl ester of a higher aliphatic alcohol and sulfuric acid.

3. A therapeutic composition comprising a polyamine acid adsorbing resin having adsorbed thereon anions represented by the formula $$(ROSO_3)^-$$

in which R is an alkyl group having between 6 and 30 carbon atoms.

4. A therapeutic composition comprising a polyamine acid adsorbing resin having adsorbed thereon anions represented by the formula $$[C_{12}H_{25}OSO_3]^-$$

5. A therapeutic composition comprising a polyamine acid adsorbing resin having adsorbed thereon anions represented by the formula $$[C_{14}H_{29}OSO_3]^-$$

EDWIN L. GUSTUS.

References Cited in the file of this patent

UNITED STATES PATENTS

| Number | Name | Date |
|---|---|---|
| 2,259,503 | Wassenegger | Oct. 21, 1941 |
| 2,366,008 | D'Alelio | Dec. 26, 1944 |
| 2,393,249 | Holmes | Jan. 22, 1946 |
| 2,461,505 | Daniel | Feb. 15, 1949 |
| 2,461,506 | Daniel | Feb. 15, 1949 |

OTHER REFERENCES

Fogelson, Arch. Int. Med., volume 73, pages 212 to 216, March 1944.

Cecil, Textbook of Medicine, 7th edition (1948), pages 780, 812.

Martin, Gastroenterology, April 1946, pages 315 to 323.

Drug and Cosmetic Industry, volume 51, October 1942, page 459.

Ser. No. 359,575, Smit (A. P. C.), published May 11, 1943.